United States Patent [19]

Gleim

[11] 4,265,711

[45] May 5, 1981

[54] METHOD OF ENHANCING DISTILLATE YIELD IN A HYDROCARBONACEOUS MATERIAL THERMOCRACKING PROCESS

[76] Inventor: William K. T. Gleim, 1250 NW. 120th St., Seattle, Wash. 98177

[21] Appl. No.: 87,505

[22] Filed: Oct. 23, 1979

[51] Int. Cl.$^3$ .......................... B01D 3/34; C07G 7/20; C10B 57/18; G10K 3/00
[52] U.S. Cl. ........................................ 201/29; 201/30; 203/9; 203/61; 208/48 AA
[58] Field of Search ........................ 201/20, 21, 24, 25, 201/28, 29, 41, 30; 203/8, 9, 61; 208/8 R, 11 R, 48 AA

[56] References Cited

U.S. PATENT DOCUMENTS

| | | | |
|---|---|---|---|
| 3,224,957 | 12/1965 | Kent | 208/48 AA |
| 3,328,283 | 6/1967 | Godar | 208/48 AA |
| 3,328,285 | 6/1967 | Godar | 208/48 AA |
| 3,867,275 | 2/1975 | Gleim et al. | 208/8 LE |
| 4,057,484 | 11/1977 | Malek | 208/8 LE |

*Primary Examiner*—Bradley Garris
*Attorney, Agent, or Firm*—Peter J. Georges

[57] ABSTRACT

A method for destructive distillation of hydrocarbonaceous distilland is disclosed wherein a dienophile is introduced into the vaporous phase to reduce the production of non-distillable polymeric product. Specifically dienophiles available economically in large amounts such as maleic anhydride are disclosed. The introduction of additional sulfide to further reduce production of asphaltenic polymeric product is also described.

17 Claims, No Drawings

METHOD OF ENHANCING DISTILLATE YIELD IN A HYDROCARBONACEOUS MATERIAL THERMOCRACKING PROCESS

BACKGROUND OF THE INVENTION

1. Field of the Invention

This invention relates to a method of performing the destructive distillation of hydrocarbonaceous materials such as coal, oil shale, tar sands, wood, etc. to obtain an upgraded distillate therefrom.

2. Background of the Invention

Formation of asphaltenes during the thermocracking of coal, oil shale, tar sands or the like, which asphaltenes are heat sensitive, non-distillable materials has been in the past and continues to be in the present a problem in maximizing distillate yield.

The production of asphaltenic polymeric material generally is attributed to the combination of organic radicals, that is, volatile free radicals in particular of the diene type formed by a retro Diels-Alder reaction.

This invention relates to a facile method of minimizing the formation of non-distillable polymeric by-products of destructive distillation by codistilling therewith dienophiles stable at the conditions of distillation, an example of such dienophiles being maleic anhydride.

SUMMARY OF THE INVENTION

This invention relates to an improvement in the destructive distillation of a hydrocarbonaceous distilland, which comprises effecting said distillation in the presence of a dienophile stable at the conditions of said distillation.

Where the destructive distillation is carried out utilizing coal a temperature range of from about 400° C. to about 1000° C. is generally employed. The particular temperature range selected is dependent on the type of coke which is desired. If metallurgical coke is selected, the produced tar—about 10 gls. per ton of coal—is only an incidental by-product and temperatures above 800° C. are employed. On the other hand, non-coking coals may be distilled at lower temperatures of from about 400° C. to 700° C. to produce both tar and a friable carbonaceous residue which is briquetted to be used primarily as household fuel. The yield of tar in this case is 3 to 5 times that obtained in high temperature coking. This process has rarely been used in the U.S. but it is common in Middle Europe.

A temperature range of from about 350° C. to 500° C. is generally employed in the pyrolysis of oil shale.

In general dienophiles are unsaturated compounds which are electron deficient because of negative, i.e. electron withdrawing constituents. In this regard compounds containing carbon to carbon double and triple bonds suitably substituted and Hetero containing compounds containing the following groups:

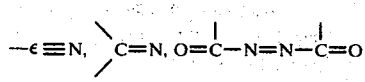

are quite suitable. Also useful in this invention are the highly active dienophiles tetracyano ethylene and dichlorofumaric acid. The preferred dienophile are unsaturated dicarboxylic acid anhydrides and specifically the most preferred unsaturated dicarboxylic acid anhydride is maleic anhydride.

In the destructive distillation of hydrocarbonaceous distillands, the overhead vaporous phase is condensed by cooling to form distillate. During distillation, and specifically upon cooling during the condensation of distillate, volatile free radicals of the diene type produced during thermocracking condense and polymerize. When an unsaturated dicarboxylic acid anhydride is introduced into the vaporous overhead phase prior to cooling thereof to form distillate, production of asphaltenes as a consequence of polymerization of the diene free radicals in the distillate is reduced and/or prevented.

Where alkenyl dicarboxylic acid anhydride is employed, it may be introduced by addition to the distilland, either prior to or during distillation or alternatively, introduction of alkenyl dicarboxylic acid anhydride may be accomplished by adding the anhydride directly into the vaporous phase prior to condensation thereof.

The introduction of a dienophile such as the dienophiles recited herein before may be accomplished in like manner as related for alkenyl dicarboxylic acid anhydrides. However, the use of maleic anhydride is preferred because of large scale availability at economical cost.

The introduction of additional $H_2S$ into the overhead to provide sulfide ions in amounts of from about 1 to about 10% by volume is found to enhance the activity of the dienophiles in preventing asphaltene production upon cooling of the distillate produced during thermocracking. Generally sulfide ions are present in hydrocarbonaceous feedstocks, in addition pyritic coal contains pyrite. However, where sulfide ions are not present in sufficient quantity in the hydrocarbonaceous material being distilled, it is preferred to add additional sulfide ions thereto. This may suitably be accomplished by the addition of ammonium sulfide.

The dienophile is generally added in an amount of from about 1% to about 20% by weight based on the amount of distillate and preferably 5% to about 10% by weight based on the amount of distillate. During distillation sulfide ions are usually present in the vaporous overhead in an amount of from about 1% to about 5% by volume.

Although not wishing to be bound thereby, it is believed that during the destructive distillation of hydrocarbonaceous materials volatile free radicals are produced which condense and polymerize upon cooling of the vapor to form material which is not distillable any more and contains asphaltenes. It has been discovered that polymerization upon cooling of the vaporous distillate can be minimized by codistilling with the thermocracked free radical-containing vapor, a dienophile such as an alkenyl dicarboxylic acid anhydride which reacts with the dienic free radicals present in the vapor. The amount of anhydride added depends upon the material being processed as well as the parameters of destructive distillation. As noted previously the amount of anhydride added is preferably from about 5% to about 10% by weight based on the quantity of distillate. In a preferred embodiment of the invention, the coal tar or shale oil fractions boiling in the range of from about 190° C. to about 210° C. are recovered from the distillate and recycled to the distilland and/or the distillation column. These fractions contain unreacted maleic anhydride. Additional maleic acid may be added to the recycle stream to maintain the desired concentrations of maleic acid in the overhead.

DETAILED DESCRIPTION OF THE INVENTION

The method of destructive distillation of a hydrocarbonaceous distilland, specifically a bituminous coal or oil shale by the addition of either a dienophile or the combination of a dienophile and a sulfur-containing compound thereto is described in the following examples which more fully delineate the invention.

EXAMPLE I

Pittsburgh seam bituminous coal is ground to a particle size of ⅛ inch or less and separated into three equal parts. One portion is thermocracked at a temperature of 800° C. to 1000° C. and a pressure of 15 p.s.i.g. in a suitable retort. The distillate is found to contain 40% by weight non-distillable polymeric product.

The second part of the coal is thermocracked at a temperature of 800° C. to 1000° C. and pressure of 15 p.s.i.g. and maleic anhydride is added directly into the vapor phase prior to condensation thereof in an amount to provide a ratio of 10% by weight maleic anhydride in the vapor phase.

Examination of the distillate indicates that the introduction of maleic anhydride diminishes the presence of non-distillable polymeric products to 10%.

The third part of the coal is subjected to distillation in the same manner as heretofore described wherein maleic anhydride addition is employed to minimize asphaltenic polymerization product formation, except that $(NH_4)_2S$ is introduced into the vaporous overhead prior to condensation thereof in an amount to provide about 10% by volume sulfide in the vapor phase.

Examination of the distillate indicates that introduction of $(NH_4)_2S$ into the vaporous overhead in the amount indicated diminishes even further the presence of non-distillable polymeric product to 5%.

EXAMPLE II

Oil shale was crushed to pieces of ¼ inches and less and separated into 3 equal portions. All portions were heated in a retort at a temperature of from 350° C. to 500° C.—at 15 p.s.i.g. The first portion yielded a distillate containing 25% non-distillables. Vaporized maleic anhydride was added to the overhead vapors in a ratio of 5 volume % while retorting the second portion under the same conditions as the first. The non-distillables in the resulting shale oil were reduced to 10% from the 25% in the preceding test. In the case of the third portion retorting was again carried out as before but in this case not only were 5 volume % of maleic anhydride vapors added to the overhead vapors from the retort but also 10 volume % ammonium sulfide. The yield of non-distillables in the condensed shale oil was reduced to 5%.

It is to be noted that the introduction may be effected by adding the maleic anhyride to the hydrocarbonaceous material being distilled or by introduction of same into the vaporous overhead fraction. In any event, the addition of maleic anhydride to the vaporous overhead should be effected prior to formation of distillate; that is, prior to cooling or condensation of the vaporous overhead product.

As is evident from the foregoing, this invention is an improvement over conventional thermocracking processes for hydrocarbonaceous material and various modifications are possible and can be made without departing from the spirit thereof. It is not intended to limit the invention to the details heretofor recited, the invention being defined in the claims which follow.

I claim:

1. In the destructive distillation of a hydrocarbonaceous distilland to form a vaporous overhead phase which thereafter is condensed to form liquid distillate containing hydrocarbons boiling within the range of from about 190° C. to about 210° C., the improvement which comprises:
   (a) introducing maleic anhydride into the vaporous overhead phase in an amount of from about 5% to about 20% by weight based on the amount of distillate obtained, said introduction being effected prior to condensation of the vaporous overhead phase to form said liquid distillate;
   (b) recovering from said liquid distillate a fraction boiling within the range of from about 190° C. to about 210° C. containing unreacted maleic anhydride; and,
   (c) recycling at least a portion of the fraction recovered in step (b) containing unreacted maleic anhydride and introducing same to the vaporous overhead phase of step (a) prior to condensation of said overhead phase to form liquid distillate.

2. The method of claim 1 further characterized in that the distillation is also effected in the presence of added sulfide, said sulfide being present in an amount of from about 5% to about 15% by volume of the vaporous phase.

3. The method of claim 2 further characterized in that the sulfide is ammonium sulfide.

4. A method of minimizing the formation of non-distillable polymeric by-products of destructive distillation by codistilling therewith dienophiles stable at the conditions of distillation which comprises introducing said dienophile into the vaporous overhead phase in an amount of from about 1% to about 20% by weight based on the amount of distillate obtained, said introduction being effected prior to condensation of the vaporous overhead phase to form said liquid distillate.

5. The method of claim 4 further characterized in that the dienophile is present in an amount of from about 5% to about 20% by weight based on the amount of distillate.

6. The method of claim 4 further characterized in that said dienophile is dicarboxylic acid anhydride, and said introducing is effected by adding said anhydride, to the distilland.

7. The method of claim 4 further characterized in that said dienophile is dicarboxylic acid anhydride, and said introducing is effected by adding said anydride directly into said vaporous phase.

8. The method of claim 4 further characterized in that the distillation is also effected in the presence of added sulfide.

9. The method of claim 8 further characterized in that said sulfide is present in an amount of from about 5% to about 15% by volume of the vaporous phase.

10. The method of claim 8 further characterized in that said sulfide is ammonium sulfide, present in the vaporous phase in an amount of about 10% by volume.

11. A method of minimizing the formation of non-distillable polymeric by-products of destructive distillation by codistilling therewith dienophiles stable at the conditions of distillation which comprises:

(a) introducing said dienophile into the vaporous overhead phase in an amount of from about 1% to about 20% by weight based on the amount of distillate obtained, said introduction being effected prior to condensation of the vaporous overhead phase to form said liquid distillate;

(b) recovering from said liquid distillate a fraction containing unreacted dienophile; and (c) recycling at least a portion of the fraction recovered in step (b) containing unreacted dienophile and introducing same to the vaporous overhead phase of step (a) prior to condensation of said overhead phase to form liquid distillate.

12. The method of claim 11 further characterized in that the dienophile is present in an amount of from about 5% to about 20% by weight based on the amount of distillate.

13. The method of claim 11 further characterized in that said dienophile is dicarboxylic acid anhydride, and said introducing is effected by adding said anhydride to the distilland.

14. The method of claim 11 further characterized in that said dienophile is dicarboxylic acid anhydride, and said introducing is effected by adding said anhydride directly into said vaporous phase.

15. The method of claim 11 further characterized in that the distillation is also effected in the presence of added sulfide.

16. The method of claim 15 further characterized in that the distillation is also effected in the presence of added sulfide, said sulfide being present in an amount of from about 5% to about 15% by volume of the vaporous phase.

17. The method of claim 15 further characterized in that said sulfide is ammonium sulfide, present in the vaporous phase in an amount of about 10% by volume.

* * * * *